United States Patent [19]

Burgdorf

[11] Patent Number: 4,824,189

[45] Date of Patent: Apr. 25, 1989

[54] BRAKE SYSTEM WITH SLIP CONTROL FOR AUTOMOTIVE VEHICLES WITH FRONT-WHEEL OR REAR-WHEEL DRIVE

[75] Inventor: Jochen Burgdorf, Offenbach-Rumpenheim, Fed. Rep. of Germany

[73] Assignee: Alfred Teves GmbH, Frankfurt am Main, Fed. Rep. of Germany

[21] Appl. No.: 32,490

[22] Filed: Mar. 30, 1987

[30] Foreign Application Priority Data

Apr. 22, 1986 [DE] Fed. Rep. of Germany ....... 3613470

[51] Int. Cl.$^4$ ............... B60T 8/26; B60T 8/32
[52] U.S. Cl. ..................... 303/119; 303/113
[58] Field of Search ............ 303/119, 115, 113, 111, 303/6 C

[56] References Cited

U.S. PATENT DOCUMENTS

| | | | |
|---|---|---|---|
| 3,506,312 | 4/1970 | Siddall | 303/6 C |
| 4,072,361 | 2/1978 | Hales | 303/6 C |
| 4,077,673 | 3/1978 | Takeshita et al. | 303/6 C |
| 4,111,495 | 9/1978 | Peeples | 303/6 C |
| 4,560,210 | 12/1985 | Tani et al. | 303/6 C |
| 4,685,747 | 8/1987 | Belart et al. | 303/119 |

FOREIGN PATENT DOCUMENTS

| | | |
|---|---|---|
| 2040450 | 4/1972 | Fed. Rep. of Germany . |
| 1630642 | 3/1973 | Fed. Rep. of Germany . |
| 2750189 | 5/1979 | Fed. Rep. of Germany . |
| 3136617 | 3/1983 | Fed. Rep. of Germany . |
| 3416979 | 11/1984 | Fed. Rep. of Germany . |
| 2161881 | 1/1986 | United Kingdom . |

Primary Examiner—Andres Kashnikow
Assistant Examiner—Matthew C. Graham
Attorney, Agent, or Firm—James B. Raden

[57] ABSTRACT

A brake system with slip control provided for vehicles with front-wheel or rear-wheel drive comprises two hydraulically isolated brake circuits (I, II) to which in each case the wheel brake (31 to 34) of one front wheel (VL, VR) and one rear wheel (HL, HR) is connected. By use of a pressure-retention valve (51, 52) which is inserted in each case into the line branch (49, 50) connecting the associated main line (53, 54) to the wheel brake (31, 33) of the driven axle (HL, HR), the brake force build-up at the driven axle (HL, HR) is delayed compared to the non-driven vehicle axle (VL, VR) during a braking action. Accordingly, brake force can be attained at both vehicle axles (VL, VR and HL, HR) in the presence of low road adherence values. In vehicles equipped with drum brakes at the rear axle, the effect desired can also be attained by arranging for specially adapted barke-shoe return springs instead of pressure-retention or differential-pressure valves.

8 Claims, 1 Drawing Sheet

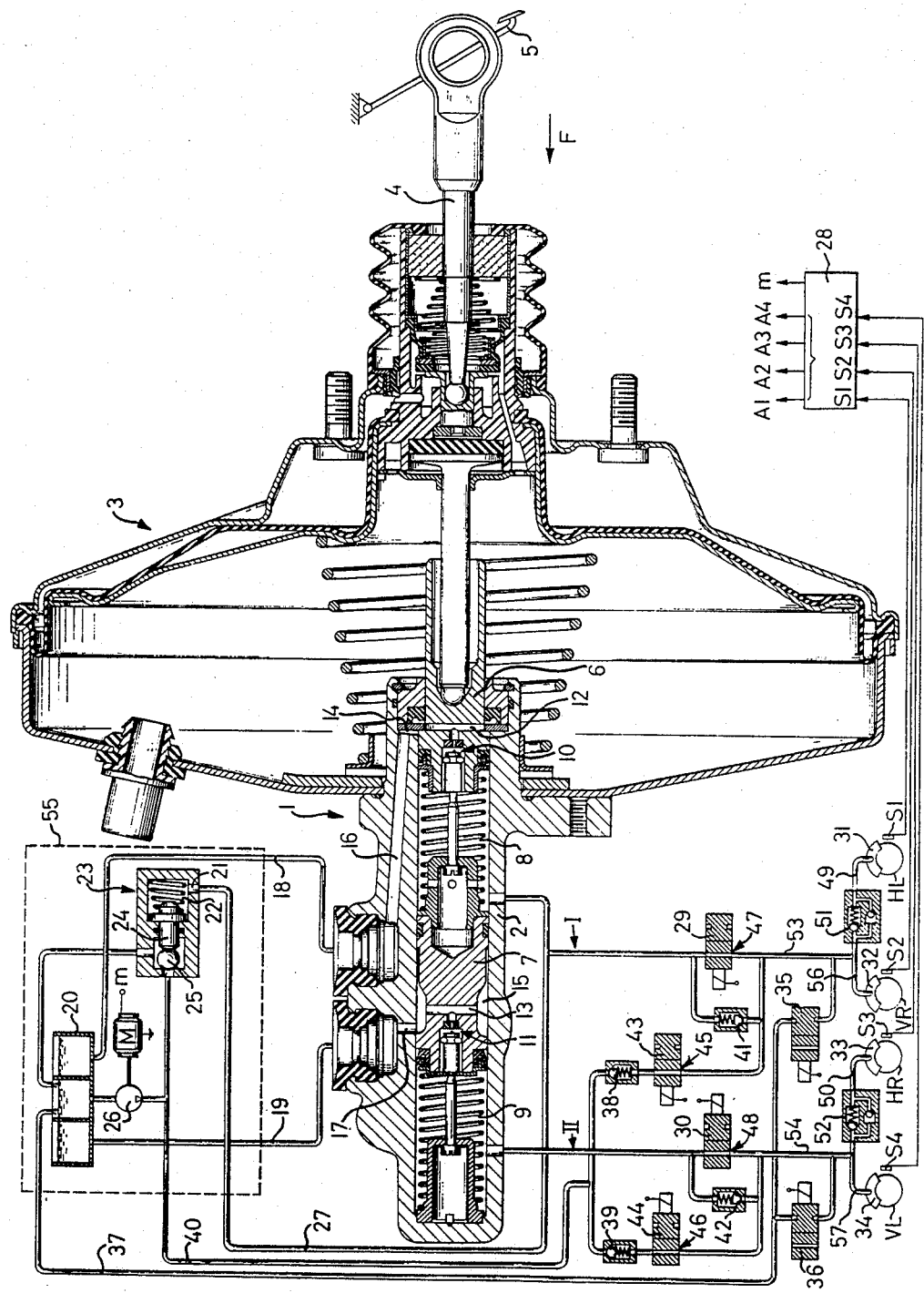

BRAKE SYSTEM WITH SLIP CONTROL FOR AUTOMOTIVE VEHICLES WITH FRONT-WHEEL OR REAR-WHEEL DRIVE

BACKGROUND OF THE INVENTION

The present invention relates to a brake system with slip control for automotive vehicles with front-wheel or rear-wheel drive. The system comprises a pedal-actuated, preferably auxiliary-force-assisted braking pressure generator, to which in each case the wheel brakes of one front wheel and one rear wheel are connected by way of two separate brake lines. An auxiliary-pressure hydraulic supply system having a hydraulic pump, and a pressure-compensating and pressure-fluid supply reservoir are provided. An auxiliary-pressure control valve is provided. Wheel sensors and electronic circuits are provided for determining the wheel rotational behavior and for generating electric braking-pressure control signals which, for the purpose of slip control, serve to control electromagnetically actuatable pressure-fluid inlet valves and outlet valves inserted into the pressure-fluid lines.

It is known that the locking of the vehicle wheels during a braking operation can be prevented in hydraulic or compressed-air operated brake systems by means of so-called inlet valves and outlet valves which are inserted into the pressure-fluid conduit to the wheel brakes. The valves are also inserted into a return line or into a pressure-discharge conduit which precludes further braking pressure rise or reduces the braking pressure as soon as the deceleration and/or the wheel slip exceeds a predetermined value. Systems of this type are known in a number of variants.

An optimal braking behavior, that is, high driving stability and directional stability and short stopping distance, can be expected at each vehicle wheel when the braking pressure is controlled individually. However, since the expenditure needed for component parts including controlling and regulating circuits, monitoring and safety circuitries etc., is very high, and since limitation to two or three control channels in combination with specific selection criteria such as select-low, select-high and with a concurrent control of the braking pressure in several wheel brakes is not disadvantages, it is expedient to depart from the individual control of all wheels.

Therefore, dual-circuit hydraulic brake systems of the type referred to have been developed and described which, on detection of an imminent risk of wheel lock, vary the braking pressure concurrently. That is, jointly for the two wheels connected by means of one common pair of inlet valve and outlet valves. If, to this end, the pressure in each control channel is dimensioned according to the select-low principle following the wheel with the worst road contact, a longer stopping distance must be tolerated.

Furthermore, it is known to additionally insert a two-way/two-position directional control valve into the pressure-fluid conduit to the wheel brake, so that, when the rear wheel is relieved from load due to the dynamic axle load shift, after change-over of this valve, locking of the relieved rear wheel is avoided. Simultaneously, further braking pressure rise at the front wheel can be effected (German published patent application No. 31 36 616). In situations in which it is decisive to use the braking effect of the rear wheels, particularly in the presence of a low road adherence valve, this known measure will not afford any improvement.

It has been proposed to normally derive the reference value for dimensioning the braking pressure in the diagonals from the front wheel, but to perform a change-over in specific situations according to predetermined criteria so that temporarily the rear wheel instead of the front wheel takes on the lead. That is, the rear wheel determines the braking pressure (German patent application No. 33 14 802.3). In some situations, however, it is a disadvantage to jointly control the braking pressure of the two wheels connected to one pressure-fluid circuit in comparison to systems with three or four control channels.

It is an object of the present invention to eliminate the shortcomings of the known slip-controlled dual-circuit brake systems and to devise a brake system which requires minor manufacturing effort and, nevertheless, affords an effective controlled braking operation both in the presence of high and low frictional values, while driving stability and steerability are preserved in all important situations. More specifically, the brake system is to be suitable for vehicles with a diagonal brake circuit split-up, and wherein braking is desired even in the event of the two wheels of the driven vehicle axle reaching the slip range as a result of the engine trailing torque, while the two wheels of the non-driven vehicle axle roll freely.

SUMMARY OF THE INVENTION

This object is achieved according to the present invention in that there is provided a hold-back element delaying the application of the brake shoes of the wheel brakes of the driven vehicle wheels on the brake drums or the brake discs so that when pressure builds up in the main brake lines connected to the braking pressure generator or the auxiliary-pressure source upon commencement of the braking operation, only the wheel brakes of the non-driven vehicle wheels are effective. The hold-back element is a switched pressure-retention valve 51, 52 which is in each case inserted into the line branch connecting the wheel brakes of the driven wheels to the pertinent main brake lines, respectively.

BRIEF DESCRIPTION OF THE DRAWINGS

Further features, advantages and applications of the present invention can be gathered from the following description of an embodiment by way of the accompanying drawings in which FIG. 1 shows the single figure is a simplified view, partially in cross-section, and partially schematic which illustrates the basic component parts of a slip-controlled brake system for a vehicle with rear-axle drive and wherein the wheel brake of a front wheel is connected together with the wheel brake of a rear wheel.

FIG. 2 shows a cross sectional view of a disc brake.

FIG. 3 shows a cross sectional view of a drum brake.

DETAILED DESCRIPTION

In the illustrated embodiment of FIG. 1, the brake system comprises as a braking pressure generator 1, a hydraulic unit which is composed of a tandem master cylinder 2 and a vacuum booster 3 connected upstream thereof. The pedal force F applied on a brake pedal 5 is transmitted by way of a push rod 4 in a known fashion onto the vacuum booster 3, and from booster 3 is further boosted by auxiliary force and applied onto the working pistons 6 and 7 of the tandem master cylinder 2.

In the shown release position of the brake, the pressure chambers 8, 9 of the master cylinder 2 are in communication with a pressure-compensating and pressure-fluid supply reservoir 20 by way of open central valves 10, 11 by way of connecting channels 12, 13 in the interior of the pistons 6, 7 and finally by way of annular chambers 14, 15 by way of connecting bores 16, 17 and by way of hydraulic lines 18, 19.

Connected to one of the two pressure chambers, such as to pressure chamber 8, is the control input 21 and thereby the control chamber 22 of auxiliary-pressure control valve 23. By way of a piston 24 in the interior of the control valve 23, the control pressure is transmitted onto a spherical seat valve 25 which is connected, on the one hand, hydraulically to the pressure side of a hydraulic pump 26 and, on the other hand, to the pressure compensating reservoir 20. The suction side of the pump 26 is likewise in communication with the reservoir 20. The pump is a hydraulic pump driven electromotively (motor M). The electrical connections "m" and "Masse" (ground) are likewise illustrated symbolically.

The two brake circuits I, II and, respectively, the main brake lines 53, 54 of the master cylinder 2 are connected with two wheel brakes 31, 32; 33, 34 each by way of electromagnetically actuatable valves opened in the initial position. The valves are so-called separating or inlet valves 29, 30. The wheel brakes 31, 32 and 33, 34 respectively, are allocated to the diagonals, that is in each case a wheel brake of a front wheel is connected to a wheel brake (of the opposite vehicle side) of a rear wheel. The wheel brakes are connected to electromagnetically actuatable outlet valves 35, 36 closed in their inactive position which are in communication with the pressure-compensating reservoir 20 by way of a hydraulic return line 37.

The brake circuits I, II are respectively by way of one intake valve 43, 44 and one non-return valve 38, 39 and by way of a connecting line 40 communicating with the auxiliary pressure supply system. That is, the brake circuits communicate with the hydraulic pump 26 and with the auxiliary-pressure control valve 23. The non-return valves 38, 39 will open as soon as the auxiliary pressure exceeds by a defined minimum value that pressure which is instantaneous prevails in the brake circuits I, II and as soon as the intake valves 43, 44 assume their opened position.

The vehicle wheels are equipped with inductive sensors $S_1$ to $S_4$ which cooperate with a toothed disc co-rotating synchronously to the wheel rotation and which generate electric signals indicative of the wheel rotational behavior. That is, the wheel speed and variations thereof. These signals are fed by way of the inputs $s_1$ to $s_4$ to an electronic signal-processing and combining circuitry 28 which generates braking-pressure control signals serving to temporarily switch over the intake, separating and outlet valves 29, 30, 35, 36, 43, 44 on detection of an imminent locked condition and to thereby keep the braking pressure constant, to decrease it and to re-increase it at the appropriate time. To this end, the actuating magnets of the inlet and outlet valves are driven by way of the outputs $a_1$ to $a_4$. For simplification, the electrical connecting lines between the ports $a_1$ to $a_4$ and the coils of the valves 29, 30, 35, 36, 43, 44 are not illustrated. The circuitry 28 can be realized in a known fashion by hard-wired circuits or by programmed electronic units, such as microcomputers or microcontrollers. The switch-on signal for the start-up of the drive motor of the hydraulic pump 26 which runs only during a slip control action is applied to the motor M by way of the connection m.

Inserted into the line branch 49, 50 of each brake circuit I, II which leads in each case to the wheel brake 31, 33 of the rear wheel (HR, HL) is each one pressure-retention and differential-pressure valve 51 and 52, respectively, the purpose of which is to ensure that the brakes of the rear wheels 31, 33 will become effective only after the associated front-wheel brakes 32, 34 are already acting.

The brake system operates as follows: On brake application, the pedal force F boosted by the vacuum in the booster 3 is transmitted onto the master cylinder pistons 6, 7. The central valves 10, 11 close, thus allowing braking pressure to develop in the pressure chambers 8, 9 and hence in the brake circuits I, II which propagates by way of the valves 29, 30 to the wheel brakes 31, 32 and 33, 34, respectively. The pressure in the chamber 8 is further supplied to the control input 21 and to the control chamber 22 of the control valve 23 and increases the closing force of the seat valve 25 which is produced by the indicated spring. However, this remains without any effect because at first the hydraulic pump 26 is not yet in operation.

On detection of an imminent locked condition at one or more of the wheels by means of the sensors $S_1$ to $S_4$ and the circuitry 28, slip control will commence. The drive motor M of the pump 26 will be switched on, thereby permitting an amount of auxiliary pressure to develop in the auxiliary-pressure supply system and in the feed line 40 which is proportional to the pressure in the control chamber 22 and in the pressure chamber 8, respectively, and thus to the pedal force F. A signal of the circuitry 28 causes change-over of the electromagnetically actuatable separating valves 29, 30 and thus closure of the brake circuits I, II. Further displacement of the master cylinder pistons 6, 7 in the direction of the pedal force F as well as emptying of the pressure chambers 8, 9 is precluded. As soon as sufficient pressure is attained, the auxiliary-pressure supply system takes over to perform the function of the braking pressure generator 1 by way of the feed line 40 and the non-return valves 38, 39 now opening. Pressure fluid flows dynamically into the brake circuits I, II by way of the non-return valves 38, 39 and the intake valves 43, 44. The actual braking pressure variation in the wheel brakes 31 to 34 is determined, on the one hand, by the inlet and outlet valves 29, 30, 35, 36 which are supplied with slip-controlling braking pressure control signals by way of the lines $a_1$ to $a_4$ and, on the other hand, by the pressure-retention valves 51, 52 inserted into the line branches 49, 50.

Defects of various kinds can be detected reliably by virtue of a circuit arrangement comparing the pressure in the pressure chamber 8 of the master cylinder 2, respectively, and the pressure in the line 27 leading to the auxiliary-pressure control valve 23, with the instantaneous auxiliary pressure produced by the pump 26 and the control valve 23, while taking into consideration the operating condition. That is, is it a normal braking action or a response action of the slip control. In the case of a braking action without slip control, pressure must build up in the pressure chamber 8, but not in the auxiliary-pressure supply system. In the event of failure or malfunction of the pump 26 or of the control valve 23, upon the occurrence of a defect in the switch-on conduit of the motor M or the like, an amount of pressure will be maintained in the pressure chamber 8 that is in excess of that in the auxiliary-pressure feed line 40 even after the commencement of slip control. Hence it follows that defects can be detected and signalled by logically combining these conditions and others by virtue of the circuitry 28. Depending on the defect, the circuitry 28 will then automatically disconnect the slip control completely or partially, that means limited to some wheel brakes, in order to still render possible effective braking through the intact brake circuit.

As can be seen from the drawing figure, the inlet and separating valves 29, 30, respectively, are still protected by non-return valves 41, 42 connected in parallel. In special cases, these non-return valves 41, 42 permit a termination of the braking pressure control and release of the wheel brakes, respectively, since a small quantity of pressure fluid can flow back from the wheel brakes into the pressure chambers 8, 9, with the separating valves 29, 30 still closed.

A particular advantage of the brake system illustrated is that the intake valves 43, 44 can be designed with a diaphragm. That is, their flow cross-sections can be dimensioned such as to prevent the pressure fluid delivered by the pump 26 from entering the wheel brakes too abruptly in the case of braking pressure control. In contrast thereto, the inlet or separating valves 29, 30 are sized more generously with respect to their flow cross-sections, whereby a "spongy" pedal feeling can be prevented.

Finally, a major advantage of the illustrated brake system in accordance with the present invention can be seen in that, in the case of braking pressure control, the noises produced by the brake system can be diminished to a minimum because of the fact that a low pressure gradient can be maintained. If, for instance, an amount of pressure of 100 bar is attained at the outlet of the pump 26 and, subsequently, the intake valves 43, 44 are opened abruptly, the pressure at the pump outlet and in the feed line, respectively, will decline comparatively slowly, since the flow cross-sections in this branch of the brake system can be dimensioned to be relatively small.

Because of the differential-pressure and pressure-retention valves 51, 52 inserted into the line branches 49, 50, in the event of the sensors S1, S3 of the rear axle sensing wheel slip, while the wheels of the front axle roll without slip, the wheel brakes 32, 34 of the front axle can be actuated. Without such pressure-retention valves 51, 52, the controller or circuitry 28 would have to shut off the intake valves 43, 44 in the described diagonal allotment of the brake circuits I, II, since otherwise the result would be a more excessive braking action of the wheel brakes 31, 33 of the rear wheels which are already in the slip range.

It is clear that, instead of a differential-pressure valve or pressure-retention valve 51, 52 in the line branch 49, 50 of a brake circuit I and II, respectively, likewise another device can be inserted directly in front of the brake 31, 33 of a drive vehicle wheel VR, HL which delays the brake 31, 33 becoming effective and/or reduces its effectiveness. As shown in FIGS. 2 and 3, a like device may be a return spring 73', 73" or a compression spring 74 which holds back the brake shoe 70 of the wheel brake of the driven wheel 31, 33, that acts in the sense of a release. The return spring 73', 73" is supported on an anchor plate 78 of a brake drum 72 or a brake caliper 76 of a disc brake 71 and on the brake shoes 70. The compression spring 74 is interposed between two opposing brake shoes 70 of a disc brake, with the two ends of the spring 74 bearing each against the backing plates 75 of the brake shoe 70. FIG. 2 shows line branches 49, 50 of a brake circuit I and II, respectively, which are connected to the wheels.

Finally, the described brake system may also be used on a vehicle with front drive. In this event, the two pressure-retention valves 51, 52 would not have to be arranged in the line branches 49, 50, but in the line branches 56, 57. That is, in the line branches of the two brake circuits I and II, respectively, which are in direct communication with the wheel brakes of the driven front wheels (these being the wheel brakes 56, 57 in this example).

What is claimed:

1. A brake system with slip control for automotive vehicles with front-wheel and vehicles with rear-wheel drive comprising a pedal-actuated, auxiliary-force-assisted braking pressure generator (1), with wheel brakes (31 to 34) of one front wheel and one rear wheel being respectively connected by way of two separate brake lines (53, 54) to the pressure generator (1), said wheel brakes comprising brake elements connected to respective wheels for rotation therewith, said brake system comprising an auxiliary-pressure hydraulic supply system with a hydraulic pump, and a pressure compensating and pressure-fluid supply reservoir (20), and an auxiliary-pressure control valve (23), a plurality of wheel sensors (S1 to S4) and electronic circuits for determining the wheel rotational behavior and for generating electric braking-pressure control signals which, for the purpose of slip control, serve to control electromagnetically actuatable pressure-fluid inlet valves (29, 30; 43, 44) and outlet valves (35, 36) inserted into the pressure-fluid lines (37; 45, 46; 53, 54), wherein there is provided a hold-back element delaying the application of brake shoes of the wheel brakes of the driven vehicle wheels on at least one brake element wherein when pressure builds up in the main brake lines (54, 54) connected to one of the braking pressure generator (1) and alternatively to the auxiliary-pressure source (55) upon commencement of the braking operation, only the wheel brakes of the non-driven vehicle wheels are effective, said hold-back element being a spring.

2. A brake system as claimed in claim 1, wherein the spring is a return spring acting upon the two brake shoes of a wheel brake in the sense of release.

3. A brake system as claimed in claim 1, wherein each individual brake shoe of a wheel brake is equipped with a return spring which is effective in the sense of release and which is supported on one of an anchor plate and a brake caliper, and on the brake shoes.

4. The brake system of claim 1 wherein said brake elements comprise brake drums.

5. The brake system of claim 1 wherein said brake elements comprise brake discs.

6. A brake system as claimed in claim 5, wherein the spring is a compression spring which is interposed between two opposing brake shoes of a disc brake, with the two ends of said spring bearing each against the backing plates of the brake shoes.

7. A brake system with slip control for automotive vehicles with front-wheel vehicles with rear-wheel drive comprising a pedal-actuated, auxiliary-force-assisted braking pressure generator (1), with wheel brakes (31 to 34) of one front wheel and one rear wheel being respectively connected by way of two separate brake lines (53, 54) to the pressure generator (1), and comprising an auxiliary-pressure hydraulic supply system (55) with a hydraulic pump (26), and a pressure-compensating and pressure-fluid supply reservoir (20), and an auxiliary-pressure control valve (23), a plurality of wheel sensors (S1 to S4) and electronic circuits for determining the wheel rotational behavior and for generating electric braking-pressure control signals which, for the purpose of slip control, serve to control electromagnetically actuatable pressure-fluid inlet valves (29, 30; 43, 44) and outlet valves (35, 36) inserted into the pressure-fluid lines (37; 45, 46; 53, 54) wherein there is provided a hold-back element delaying the application of the brake shoes of the wheel brakes (31, 33) of the driven vehicle wheels on the associated brake engaging elements wherein when pressure builds up in the brake circuits (I, II) connected to one of the braking pressure generator (1) and the auxiliary-pressure source (55) upon commencement of the braking operation, only the wheel brakes (33, 34) of the non-driven vehicle wheels are effective, said hold-back element being in each case a switched pressure-retention valve (51, 52 which is inserted into the respective line branch (49, 50) connecting the wheel brakes (31, 33) of the driven vehicle wheels to associated main brake lines (53, 54).

8. A brake system as claimed in claim 7, wherein the pressure-retention valve (51, 52) comprises a closing member regulating the flow to the wheel cylinder and being acted upon by a spring in the closing sense, while another closing member is provided which permits the pressure fluid to flow back from the wheel cylinder into the main brake line (53, 54) after the braking action.

* * * * *